E. G. BAILEY.
ORIFICE PLATE FOR FLOW METERS.
APPLICATION FILED MAR. 16, 1916.
1,248,058.
Patented Nov. 27, 1917.
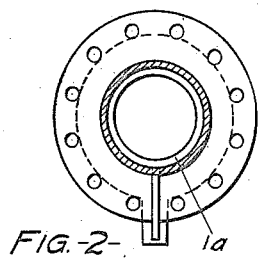
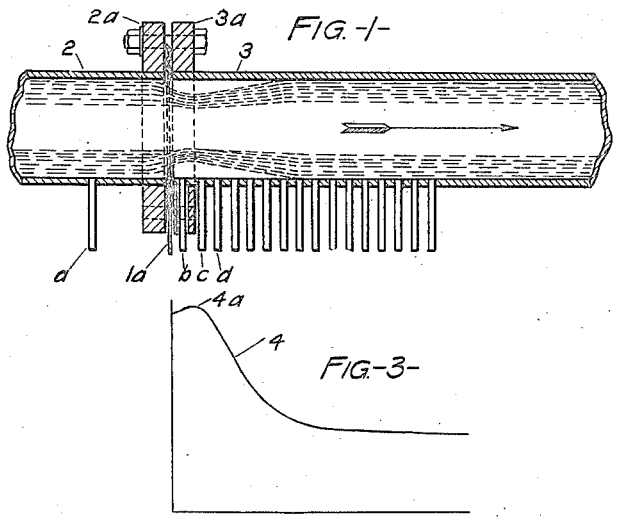
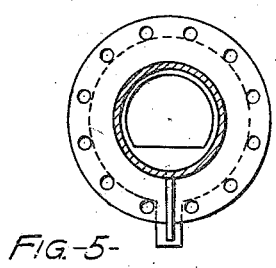
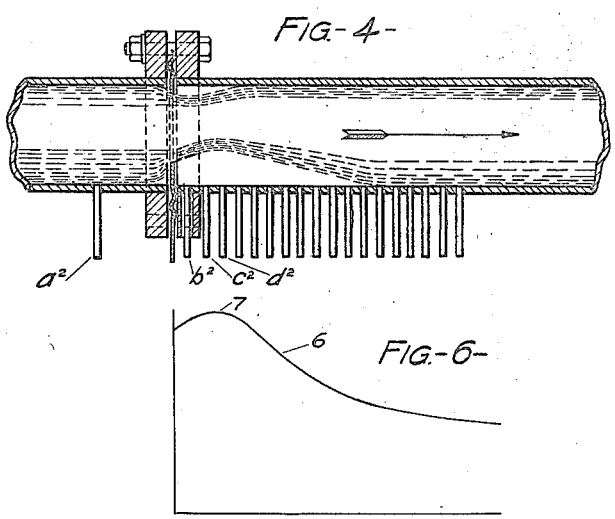
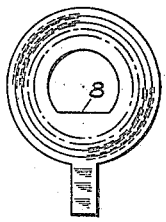
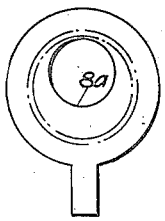
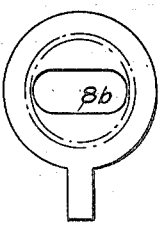
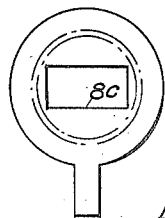
Inventor
Ervin G. Bailey.
By
Attorney

UNITED STATES PATENT OFFICE.

ERVIN G. BAILEY, OF NEWTON HIGHLANDS, MASSACHUSETTS, ASSIGNOR TO BAILEY METER COMPANY, A CORPORATION OF MASSACHUSETTS.

ORIFICE-PLATE FOR FLOW-METERS.

1,248,058.

Specification of Letters Patent.

Patented Nov. 27, 1917.

Application filed March 16, 1916. Serial No. 84,723.

*To all whom it may concern:*

Be it known that I, ERVIN G. BAILEY, a citizen of the United States, residing in Newton Highlands, in the county of Middlesex and State of Massachusetts, have invented an Improvement in Orifice-Plates for Flow-Meters, of which the following description, in connection with the accompanying drawings, is a specification, like letters on the drawings representing like parts.

The present invention relates to an obstruction plate or orifice-disk which forms part of a flow meter, and is placed in a pipe line for the purpose of partially obstructing the flow of fluid being measured. The novelty of the plate embodying the present invention lies in the peculiar shape and relative dimensions of the orifice opening with respect to the pipe in which it is placed, and is for the purpose of causing a more dependable pressure difference than is caused by using, as the obstruction, a plate having a concentric orifice of the usual type.

The use of an obstruction in measuring the flow of fluids has been limited almost entirely to cases where the egress for fluid is through the side of a large reservoir or in the middle of a pipe with a cross-sectional area much larger than the area of the orifice, and the flow of fluid equally obstructed on all sides. Under these conditions, the coefficient of discharge is fairly well known and dependable, but such orifices are only satisfactory for comparatively low velocities of flow. In measuring steam flowing through pipes at the very high velocities that are now prevalent, however, it is not feasible to use an orifice having an area that is small in comparison with the area of the pipe since the obstruction would be so great as to result in an excessive pressure loss. It has been found, moreover, that the coefficient of discharge varies widely when using a relatively large circular orifice, and especially when the pressure connections are at distances that are available for drilling and tapping the pipe or fittings. Further investigation, moreover, has shown that for a given orifice and a given rate of flow the pressure difference obtained depends greatly upon the distance of the down stream connection from the orifice plate. In other words, the maximum pressure difference is close to the orifice and the pressure difference rapidly decreases from that point.

I have found that both of the above described objections can be obviated by the use of an orifice of novel form in which the egress area is sufficient to obviate excessive pressure loss, the edges of the orifice, however, being at unequal distances from the center of the pipe. In this case the low-pressure or down-stream connection is tapped from the side of the main pipe where the edge of the orifice is at the greatest distance therefrom, the result being that the pressure curve is similar to that obtained with a concentric orifice of much smaller capacity. My invention is embodied in an orifice plate having these characteristics, and for the purpose of illustrating the invention and clearly explaining the difference in results between the plate embodying my invention and the plate having the concentric orifice, I have shown in the drawings, the latter (*i. e.* the old construction) as well as the novel construction which forms the subject matter of my invention.

Figures 1, 2 and 3 do not show the device embodying the invention but are for the purpose of comparison and explanation only and they represent an orifice of the only kind, which, to the best of my knowledge and belief, has been used in flow meters operating on this principle, viz: an orifice concentric with the pipe in which it is placed.

Fig. 1 is a longitudinal section of a pipe or duct having an orifice plate of known construction, showing a pressure connection on the upstream side, and a number of pressure connections at the downstream side of the plate; Fig. 2 is an end view of the orifice plate and pipe; Fig. 3 is a curve plotted to show the pressure differences as measured between the upstream and the several downstream connections of the pipe at one rate of flow of fluid therethrough; Figs. 4, 5, and 6, are views corresponding to Figs. 1, 2, and 3, but showing an orifice plate embodying my invention; Fig. 7 is a plan view of an orifice plate similar to that shown in Figs. 4 and 5, but of smaller area; and Figs. 8, 9 and 10 are views similar to Fig. 7 showing modifications.

The obstruction plate or orifice disk described herewith is for use as an essential part of a flow meter wherein the pressure difference caused by fluid flowing past such obstruction is utilized as the basis of measurement. It is the sole purpose of such obstruction or orifice plate to give a known and dependable pressure difference for each rate of flow.

It is to be understood that the plurality or group of pressure connections shown in the downstream pipe in Figs. 1 and 4 is not a part of the meter itself, but is shown in conjunction with the plotted curves, Figs. 3 and 6, as a convenient way of explaining the purpose of the invention, which will be fully described hereinafter.

As is well known in hydraulics, when a fluid flows through a sharp edged orifice, the stream contracts to a considerably smaller area beyond the face of the orifice than the area of the orifice itself, and then the stream gradually expands. In other words, it closely follows the curves of the well known Venturi tube as shown by the broken lines, Fig. 1, although there are no confining walls present.

In Fig. 1, the orifice disk $1^a$ is shown as clamped between the flanges $2^a$ and $3^a$ of the upstream or high pressure pipe 2 and the downstream or low pressure pipe 3. The orifice is concentric with the pipes and has a relatively large area. In order to illustrate the effect of the orifice on the pressure of the flowing fluid, I have shown the pipe 3 as provided with a plurality of pressure connecting pipes $b$, $c$, $d$, etc. arranged at different distances from the orifice, and in Fig. 3, I have plotted a curve showing differences in pressure between the connection $a$, in the pipe 2 and the connections $b$, $c$, $d$, etc. in the pipe respectively.

It will be seen that the greatest pressure difference is obtained from measurements between the connection $a$ and a connection placed between $b$ and $c$, which is a short distance from the orifice plate on its downstream side, and corresponds to the greatest contraction in the fluid stream. For accuracy in meter measurement it is desirable to use the maximum pressure difference; hence it is necessary to locate the down stream pressure connection at the point where the curve shows the greatest pressure difference. But such a location of the downstream connection in this case would require that the flange be drilled or grooved out near its side, or else that a special flange be used, any of which expedients would be objectionable, if not impossible. Furthermore, it is noted from Fig. 3, that the curve 4 is very steep on both sides of the maximum $4^a$ so that a very slight error or miscalculation in placing the downstream connection at the proper distance from the orifice plate would lead to serious error.

I have found that all of these difficulties can be overcome by using an orifice of some shape other than a round hole concentric with the pipe, if the shape is such that the distance between the edge of the orifice and the wall of the pipe through which the pressure is taken is equivalent to the distance between the wall of the pipe and the edge of a comparatively small concentric orifice while the remainder of the orifice is of sufficient size to obviate objectionable loss of pressure. This causes the point of least static pressure to be at a desired distance from the orifice plate, and to remain uniform over a reasonable distance along the length of the pipe as is the case with the small concentric orifice. In other words, the orifice is provided with sufficient area to permit the desired rate of flow without excessive pressure loss while the obstructing edge of the orifice plate which is on a radial line with the downstream pressure connection, projects far enough in from the circumference of the pipe to produce the same useful effect, as if the area of the orifice were small in relation to the area of the pipe.

Referring to Figs. 4 and 6, which show respectively experimental pressure connections $a^2$, $b^2$, $c^2$, $d^2$, etc., and a plotted curve 6, corresponding respectively to those shown in Figs. 1 and 3 it will be seen that the point of greatest pressure difference in this case (shown at 7 on the curve 6) is farther away from the orifice plate so that the downstream pressure connection will be clear of the flange. The more gradual rise and fall of the curve also indicates that substantially the same pressure extends over a greater area, so that nearly the same pressure difference will be indicated even if the pressure connection is not located exactly as desired.

It is readily seen, therefore, that from a practical standpoint the construction embodying the present invention is much more desirable and more conducive to accuracy than the construction embodying the orifice plate shown in Figs. 1 and 2.

Fig. 7 shows the shape of the orifice plate illustrated in Fig. 4, the widest part 8 of the obstruction being adjacent to the side of the pipe from which the pressure connections lead. It has been demonstrated, however, that the general shape of the orifice has little effect upon its coefficient of discharge, the principal point being to have the widest part of the obstruction properly proportioned for the conditions required. It is not essential, therefore, that the orifice should be segment shaped, as shown in Figs. 4, 5, and 7, but any shape can be employed in which the greatest distance from the wall of the pipe is sufficient to obtain the desired result, while the entire area of the orifice is large enough to avoid excessive loss of pressure. The orifice, for example, may be circular, but eccentric with the pipe as shown in Fig. 8, or elongated as shown in Fig. 9, or of any other shape different from that of a round hole concentric with the pipe, so long as the greatest distance from the wall of the tube is sufficient for the purpose. In Figs. 8, 9, and 10, the parts corresponding to the part 8 described in connection with Figs. 4 and 7 are indicated respectively by the reference characters 8$^a$, 8$^b$, and 8$^c$.

As an additional, though non-essential, feature of the invention, I have shown the outer part of the plate corrugated so that it forms an integral gasket or packing, while the plate lies between the flanges, thereby obviating the use of separate rubber or soft sheet packing that would necessarily be used on both sides of the plate if the integral packing were not employed.

What I claim is:

1. An orifice plate for obstructing the flow of fluid through a duct for the purpose of creating a drop in pressure, which comprises a disk substantially circular in circumference the said disk having an orifice, the edge of which orifice comprises a portion substantially concentric with the wall of the duct, and a straight portion, the portion of the plate between said straight portion of the orifice edge and the wall of the duct affording the main obstruction to the flow through the duct.

2. An orifice plate for obstructing without preventing the flow of fluid through a duct for the purpose of creating a drop in pressure, which comprises a disk substantially circular in circumference, the said disk having an orifice, the boundary of which is at a greater distance from the edge of the plate at one point than at another, and circumferentially located corrugations in the surface of the plate between the edge of the plate and the boundary of the orifice.

3. A pipe line having flanges at the meeting ends of pipe sections and an orifice plate secured between said flanges, said pipe line being provided with suitable pressure connections on the upstream and downstream sides of said orifice plate; the edge of the orifice nearest to the down stream pressure connection being at a greater distance from the side of the pipe than the other portions of the edge of the orifice are from the side of the pipe.

4. The herein described means for obstructing the flow of fluid through a pipe for the purpose of producing a measurable difference between the pressure of the non-obstructed fluid and the pressure of the obstructed fluid, which consists of a transverse plate located in the pipe, the greatest obstructing portion of the plate being adjacent to the side of the pipe from which the pressure connections are taken.

In testimony whereof, I have signed my name to this specification.

ERVIN G. BAILEY.